United States Patent [19]
Abolins et al.

[11] Patent Number: 4,661,560
[45] Date of Patent: * Apr. 28, 1987

[54] COMPOSITIONS COMPRISING COPOLYMERS OF A VINYL AROMATIC COMPOUND AND AN UNSATURATED CYCLIC ANHYDRIDE AND IMPACT IMPROVERS

[75] Inventors: Visvaldis Abolins, Delmar, N.Y.; John C. Goossens, Mount Vernon, Ind.; Fred F. Holub, Schenectady; Gim F. Lee, Jr., Albany, both of N.Y.

[73] Assignee: General Electric Company, Selkirk, N.Y.

[*] Notice: The portion of the term of this patent subsequent to Sep. 13, 2000 has been disclaimed.

[21] Appl. No.: 652,950

[22] Filed: Sep. 21, 1984

Related U.S. Application Data

[62] Division of Ser. No. 507,583, Jun. 24, 1983, Pat. No. 4,478,979, which is a division of Ser. No. 333,984, Dec. 23, 1982, Pat. No. 4,404,321, which is a division of Ser. No. 163,422, Jun. 27, 1980, abandoned, which is a division of Ser. No. 839,905, Oct. 6, 1977, Pat. No. 4,234,701.

[51] Int. Cl.$^4$ ............................................. C08L 61/04
[52] U.S. Cl. ...................................... 525/68; 525/74; 525/905
[58] Field of Search ........................... 525/68, 74, 905

[56] References Cited

U.S. PATENT DOCUMENTS

| 3,383,435 | 5/1968 | Cizek . |
| 3,642,949 | 2/1972 | Stafford et al. . |
| 3,792,123 | 2/1974 | Abolins et al. . |
| 3,833,688 | 9/1974 | Abolins et al. . |
| 3,956,423 | 5/1976 | Katchman . |
| 4,108,925 | 8/1978 | Lee, Jr. . |
| 4,113,797 | 9/1978 | Lee, Jr. . |
| 4,124,654 | 11/1978 | Abolins et al. . |
| 4,147,739 | 4/1979 | Lee, Jr. . |
| 4,404,321 | 9/1983 | Abolins et al. ........................ 525/68 |

Primary Examiner—Jacob Ziegler
Attorney, Agent, or Firm—Michael J. Doyle

[57] ABSTRACT

Thermoplastic molding compositions are disclosed which comprise an intimate admixture of (a) a copolymer of a vinyl aromatic compound and an $\alpha,\beta$-unsaturated cyclic anhydride, including rubber-modified copolymers thereof, and (b) impact modifiers comprising graft copolymers, copolyesters, and rubber-modified homopolymers. Optionally, the compositions can also include a polyphenylene ether resin and further, optionally, a normally liquid polybutadiene oligomer. Mixing (a) with a polyphenylene ether leads to a compatible composition, markedly improved in heat deflection temperature.

10 Claims, No Drawings

COMPOSITIONS COMPRISING COPOLYMERS OF A VINYL AROMATIC COMPOUND AND AN UNSATURATED CYCLIC ANHYDRIDE AND IMPACT IMPROVERS

This is a division of copending application Ser. No. 507,583 filed June 24, 1983, now U.S. Pat. No. 4,478,979, which is a division of application Ser. No. 333,984 filed Dec. 23, 1982, now U.S. Pat. No. 4,404,321 which is a division of application Ser. No. 163,422, filed June 27, 1980, abandoned, which is a division of application Ser. No. 839,905 filed Oct. 6, 1977, now U.S. Pat. No. 4,234,701.

The present invention relates to thermoplastic molding compositions which are based on an intimate admixture of a copolymer of a vinyl aromatic compound and an $\alpha,\beta$-unsaturated cyclic anhydride and a grafted, copolymerized or blended impact modifier, with or without a polyphenylene ether resin and optionally a liquid polybutadiene present. The compositions of this invention provide molded articles having good overall mechanical properties, e.g., impact strength, tensile strength, tensile elongation, and the like.

BACKGROUND OF THE INVENTION

Vinyl aromatic resins, e g., polystyrene, have been found to be useful in thermoplastic molding compositions. Vinyl aromatic resins have poor heat distortion and impact resistance, however, and attempts have been made to upgrade these properties. One approach has been to modify the vinyl aromatic resins by copolymerizing these materials with $\alpha,\beta$-unsaturated cyclic anhydrides, to form copolymers such as poly(styrene-maleic anhydride). Although improvements in heat resistance and solvent resistance are provided, the resulting copolymers are somewhat brittle, and they do not have good resistance to impact.

Various attempts have been made to improve the impact resistance of copolymers of vinyl aromatic resins and $\alpha,\beta$-unsaturated cyclic anhydrides. For instance, these copolymers have been blended with nitrile rubbers. Blends of nitrile rubber and styrene-maleic anhydride copolymers are disclosed in U.S. Pat. Nos. 2,914,505 and 3,641,212. With some of these compositions, however, the components are not compatible, and the compositions are difficult to prepare.

The following commonly assigned copending applications disclose proposals to solve the problems stated above. Lee and Abolins, Ser. No. 477,435, filed June 7, 1974, now abandoned, who employ block copolymers or graft copolymers in combination with the vinyl aromatic/unsaturated cyclic anhydride copolymers; Lee, Ser. No. 671,569, filed Mar. 29, 1976, now abandoned, who discloses block copolymers with rubber-modified vinyl aromatic/unsaturated cyclic anhydride copolymers; Abolins and Lee, Ser. No. 671,341, now abandoned, who disclose polyphenylene ether resins with vinyl aromatic/unsaturated cyclic anhydride copolymers; and Haaf and Lee, Ser. No. 693,895, filed June 8, 1976, who disclose radial teleblock copolymers in combination with vinyl aromatic/unsaturated cyclic anhydride copolymers, optionally rubber modified. The applications are incorporated herein by reference.

It has now been surprisingly discovered that copolymers of a vinyl aromatic compound and an $\alpha,\beta$-unsaturated cyclic anhydride can be combined with an all acrylic emulsion graft copolymer to form compositions which can be molded to articles having excellent mechanical properties, including good impact strength, tensile yield and elongation, especially when combined with a polyphenylene ether resin. It has further been discovered that such an all acrylic emulsion graft copolymer can be used to enhance the important properties of rubber modified vinyl aromatic/unsaturated cyclic anhydride copolymers, with and without the addition of a polyphenylene ether resin.

It has been further discovered that the toughness of both unmodified and rubber-modified vinyl aromatic/unsaturated cyclic anhydride copolymers can be remarkably enhanced by combination with a vinyl aromatic, acrylonitrile-diene graft copolymer. The results are surprising in view of earlier work with an acrylic-vinyl aromatic-diene rubber graft copolymer.

Still a further discovery has been made in which compositions comprising a vinyl aromatic/unsaturated cyclic anhydride copolymer, a polyphenylene ether resin, and a graft copolymer resin, a rubber modified vinyl aromatic resin, or a segmented copolyester resin are vastly improved in ductile impact properties by adding a small amount normally liquid diene oligomer.

A further broad discovery resides in finding that lower than expected levels of polyphenylene ether resin can be employed in combination with vinyl aromatic/unsaturated cyclic anhydride copolymers, than would have been expected from work with vinyl aromatic homopolymers and graft copolymers, thus permitting retention of heat distortion temperatures at higher predetermined levels.

SUMMARY OF THE INVENTION

The present invention provides, in its broadest aspects, a thermoplastic composition which comprises an intimate admixture of:
(a) a copolymer of a vinyl aromatic compound and an $\alpha,\beta$-unsaturated cyclic anhydride, and
(b) an impact modifier comprising (i) a graft copolymer comprising a vinyl aromatic compound, and a diene, alone, or in combination with an acrylonitrile; or (ii) a graft copolymer consisting essentially of acrylic ester units.

In a preferred feature, such compositions will also include a polyphenylene ether resin.

In another aspect, this invention provides a thermoplastic molding composition comprising an intimate admixture of
(a) a diene rubber modified copolymer of styrene and maleic anhydride;
(b) an impact modifier comprising
 (i) a graft copolymer comprising a vinyl aromatic compound, and a diene alone or in combination with an acrylonitrile;
 (ii) a graft copolymer comprising an acrylic ester, alone, or in combination with a vinyl aromatic compound, alone, or in further combination with a diene;
 (iii) a rubber modified vinyl aromatic compound comprising from 20 to 45 percent by weight of a diene rubber; or
 (iv) a segmented polyester having a multiplicity of recurring intralinear etherester and/or ester units;
(c) a polyphenylene ether resin; and
(d) an effective ductile impact strength improving amount of low molecular weight normally liquid polybutadiene oligomer.

In still another aspect, the present invention provides a process for the preparation of a thermoplastic composition which comprises intimately admixing (a) a copolymer of a vinyl aromatic compound and an α,β-unsaturated anhydride, and (b) a polyphenylene ether resin, (a) being added in an amount which is at least sufficient to improve the processability of the combination of (a) and (b) without decreasing the heat distortion temperature of (a) and (b) substantially in comparison with a composition of (b) with a polymerized vinyl aromatic compound essentially free of any copolymerized α,β-unsaturated anhydride, at the same vinyl aromatic compound control.

DETAILED DESCRIPTION OF THE INVENTION

The copolymers of a vinyl aromatic compound and an α,β-unsaturated cyclic anhydride (i) are well known in the art and are described in the literature. In general, they are prepared by conventional bulk solution or emulsion techniques using free-radical initiation. For example, styrene-maleic anhydride copolymers can be obtained by simply reacting the two monomers, i.e., styrene and maleic anhydride, at 50° C. in the presence of benzoyl peroxide. The rate of polymerization may be better controlled if a solvent such as acetone, toluene or xylene is used.

The vinyl aromatic compound of component (a) can be derived from compounds of the formula:

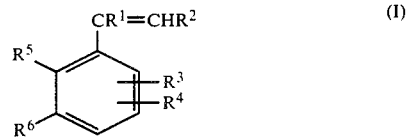

(I)

wherein $R^1$ and $R^2$ are selected from the group consisting of (lower) alkyl or alkenyl groups of from 1 to 6 carbon atoms and hydrogen; $R^3$ and $R^4$ are selected from the group consisting of chloro, bromo, hydrogen and (lower) alkyl of from 1 to 6 carbon carbon atoms; $R^5$ and $R^6$ are selected from the group consisting of hydrogen and (lower) alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred vinyl aromatic compound.

The α,β-unsaturated cyclic anhydride of component (i) can be represented by the formula:

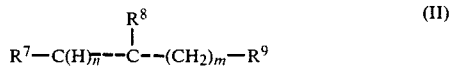

(II)

wherein the dotted lines represent a single or a double carbon to carbon bond, $R^7$ and $R^8$ taken together represents a

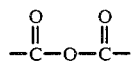

linkage, $R^9$ is selected from the group consisting of hydrogen, vinyl, alkyl, alkenyl, alkylcarboxylic or alkenyl-carboxylic of from 1 to 12 carbon atoms, n is 1 or 2, depending on the position of the carbon-carbon double bond, and m is an integer of from 0 to about 10. Examples include maleic anhydride, citraconic anhydride, itaconic anhydride, aconitic anhydride, and the like.

The preparation of these copolymers is described in U.S. Pat. Nos. 2,971,939; 3,336,267 and 2,769,804, the disclosures of which are incorporated herein by reference.

The copolymers which comprise component (a) include rubber-modified copolymers thereof. The rubber employed in preparing the rubber-modified copolymers of a vinyl aromatic compound and an α,β-unsaturated cyclic anhydride can be a polybutadiene rubber, butyl rubber, styrene-butadiene rubber, acrylonitrile rubber, ethylene-propylene copolymers, natural rubber, EPDM rubbers and the like.

The preparation of rubber-modified copolymers of a vinyl aromatic compound and an α,β-unsaturated cyclic anhydride is described in Netherlands No. 72,12714, which is incorporated herein by reference.

Component (a) can comprise from 40 to 1 parts by weight of the α,β-unsaturated cyclic anhydride, from 60 to 99 parts by weight of a vinyl aromatic compound and from 0 to 25 parts by weight of rubber. The preferred polymers will contain about 25–5 parts by weight of the α,β-unsaturated cyclic anhydride, 75–95 parts by weight of the vinyl aromatic compound, and 10 parts by weight of rubber.

A preferred unmodified vinyl aromatic α,β-unsaturated cyclic anhydride copolymer useful in the composition of this invention is Dylark 232, commercially available from Arco Polymers. Dylark 232 is a styrene-maleic anhydride copolymer containing about 11% maleic anhydride, the balance being styrene. A preferred rubber-modified vinyl aromatic α,β-unsaturated cyclic anhydride copolymer is Dylark 240, which is also available from Arco Polymers. Dylark 240 is a high impact styrene-maleic anhydride copolymer containing 9–10% rubber and 9% maleic anhydride, the balance being styrene.

The graft copolymers (b) (i) and (ii) are available commercially or can be prepared by following the teachings of the prior art. As an illustration, the graft polymerization product of an acrylic monomer, a vinyl aromatic monomer and/or acrylonitrile monomer and a diene rubber preferably comprises a backbone polymer of the units of butadiene or butadiene and styrene, wherein the butadiene units are present in quantities of at least 40% by weight of the backbone polymer, (a) an acrylic monomer, a vinyl aromatic monomer or an acrylonitrile monomer graft polymerized to (1), said monomer units being selected from the group consisting of lower alkyl methacrylates, alicyclic methacrylates and alkyl acrylates, vinyl or substituted-vinyl aromatics or substituted aromatics, e.g., benzene or naphthalene rings, and/or acrylonitrile or substituted acrylonitriles, monomer graft polymerized to (1); sequentially or simultaneously with the polymerization of (1).

The graft polymerization product of an acrylic monomer alone or with, e.g., styrene monomer and/or with, e.g., acrylonitrile and the rubbery diene polymer or copolymer may be prepared by known techniques, typically by emulsion polymerization. They may be formed from a styrene-butadiene copolymer latex or a butyl acrylate polymer latex and a monomeric material such as methyl methacrylate alone or with another compound, e.g., styrene alone, and/or with an acrylonitrile or substituted acrylonitrile. For example, in the preparation of a representative material, 85–65 parts by weight of monomeric methyl methacrylate or monomeric methyl methacrylate to the extent of at least 55% and preferably as much as 75% by weight in admixture with another monomer which copolymerizes therewith, such as ethyl acrylate, acrylonitrile, vinylidene chloride, styrene, and similar unsaturated compounds containing a single vinylidene group, is added to 15–35 parts by weight of solids in a styrene-butadiene copolymer latex. The copolymer solids in the latex comprise about 10–50% by weight of styrene and about 90–50% by weight of butadiene and the molecular weight thereof is within the range of about 25,000 to 1,500,000. The copolymer latex of solids in water contains a dispersing agent such as sodium oleate or the like to maintain the copolymer in emulsion. Interpolymerization of the monomer or monomeric mixture with the copolymer solids emulsified in water is brought about in the presence of a free-radical generating catalyst and a polymerization regulator which serves as a chain transfer agent, at a temperature of the order of 15° C. to 80° C. Coagulation of the interpolymerized product is then effected with a calcium chloride solution, for instance, whereupon it is filtered, washed and dried. Other graft copolymers and differing from the above only in the ratio of monomeric material solely or preponderantly of methyl methacrylate to the butadiene-styrene copolymer latex in the presence of which it is polymerized extends from 85–25 parts by weight of the former to 15–75 parts by weight of the latter. These materials may extend in physical properties from relatively rigid compositions to rubbery compositions. Also, U.S. Pat. No. 3,792,123, which is incorporated by reference, contain additional information as to the preparation of these materials. Other preferred commercially available materials are a styrene-butadiene graft copolymer designated Blendex 525 by Marbon Chemical Co.

In certain compositions herein, a three component graft copolymer comprising an acrylate, a styrene and a diene rubber backbone will be exemplified. This can be made following the foregoing teachings, and is also available from Rohm & Haas as the product designated Acryloid KM-611.

It is also possible to use the so-called "all acrylic impact modifiers" of the type designated Acryloid KM-323B by Rohm and Haas.

Other acrylic modifiers are those comprised of acrylic ester units and vinyl aromatic units, such as the butyl acrylate styrene graft copolymers made by the procedures described, e.g., by Ito, et al, in Chemical Abstracts, Vol. 84, entry 84:5874 g., 1976.

In other compositions herein, a segmented copolyester will be exemplified. These are made following the general teachings of U.S. Pat. Nos. 3,023,182; 3,651,014; 3,763,109 and 3,766,146, each of which is incorporated herein by reference.

A preferred segmented thermoplastic copolyester is one that hardens rapidly from the molten state consisting essentially of a multiplicity of recurring long chain ester units and short chain ester units joined head-to-tail through ester linkages, said long chain ester units being represented by the formula:

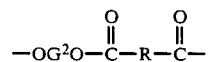
(A)

and said short chain units being represented by the formula:

(B)

where $G^2$ is a divalent radical remaining after the removal of terminal hydroxyl groups from a poly(alkylene oxide) glycol having a melting point of less than about 60° C., a molecular weight of about 400–4000 and a carbon to oxygen ratio of about 2.5–4.3; R is a divalent radical remaining after removal of carboxyl groups from a dicarboxylic acid having a molecular weight less than about 300 and $D^3$ is a divalent radical remaining after removal of hydroxyl groups from a diol having a molecular weight less than about 250; provided, (a) said short chain ester units amount to about 48–67% by weight of said copolyester, (b) at least about 80% of the R groups in A and B are 1,4-phenylene radicals and at least about 80% of the $D^3$ groups in B are 1,4-butylene radicals, and (c) the sum of the percentages of R groups which are not 1,4-phenylene radicals and of $D^3$ groups which are not 1,4-butylene radicals does not exceed about 20; also an additional type of copolyester is that as described hereinabove except that:

(a) said short chain ester units amount to about 66–95% by weight of said copolyester.

(b) at least about 70% of the R groups in Formulas A and B are 1,4-phenylene radicals and at least about 70% of the D groups in Formula B are 1,4-butylene radicals, and (c) the sum of the percentages of R groups in Formulas A and B which are not 1,4-butylene radicals does not exceed about 30.

The preferred materials are commercially available as Hytrel 4055 and Hytrel 5555 from E. I. duPont de Nemours and Company.

In certain compositions herein, a rubber modified vinyl aromatic compound comprising from 20 to 45 percent by weight of a diene rubber will be exemplified. Those can be made by intimately admixing, e.g., polystyrene and a polybutadiene rubber, and are also available commercially in a preferred embodiment from Union Carbide, product designated TDG-2100.

In certain compositions herein, a normally liquid polybutadiene oligomer will be exemplified. These can be made by conventional means, e.g., by alkali metal or organometallic catalyzed synthesis, to produce a low molecular weight polymer, e.g., of from 500 to 3000 or more, molecular weight, which is normally liquid as described, e.g., in U.S. Pat. No. 3,678,121, incorporated herein. Only a small amount of the butadiene oligomer is needed to improve Gardner (ductile) impact strength, e.g., 0.5 to 5% by weight, based on components (a), (b), (c) and (d). A preferred polybutadiene oligomer has a molecular weight of 2000 and a viscosity, at 50° C., of about 290 poise.

As noted above, the compositions of this invention can also include a polyphenylene ether resin. The polyphenylene ether resins are preferably of the formula:

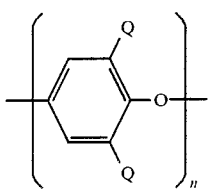

(III)

wherein the oxygen ether atom of one unit is connected to the benzene nucleus of the next adjoining unit, n is a positive integer and is at least 50 and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Examples of polyphenylene ethers corresponding to the above formula can be found in Hay, U.S. Pat. Nos. 3,306,874 and 3,306,875 and in Stamatoff, U.S. Pat. Nos. 3,257,357 and 3,257,358, which are incorporated herein by reference.

For purposes of the present invention, an especially preferred family of polyphenylene ethers includes those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1,4-phenylene) ether; poly(2,6-diethyl-1,4-phenylene)ether; poly(2-methyl-6-ethyl-1,4-phenylene)ether; poly(2-methyl-6-propyl-1,4-phenylene ether; poly(2,6-dipropyl-1,4-phenylene)ether; poly(2-ethyl-6-propyl-1,4-phenylene)ether; and the like. The most preferred polyphenylene ether resin is poly)2,6-dimethyl-1,4-phenylene)ether, preferably having an intrinsic viscosity of about 0.5 deciliters per gram as measured in chloroform at 25° C.

The components of the compositions of this invention are combinable in a wide range of proportions. The compositions can comprise, for instance, from about 5 to about 95, preferably from about 40 to about 90 parts by weight of (a) the copolymer of a vinyl aromatic compound and an α,β-unsaturated cyclic anhydride, and from about 95 to about 5, preferably from about 60 to about 10, parts by weight of (b) the impact modifier.

When a polyphenylene ether resin is also used, the compositions will preferably include from about 5 to about 95, preferably from about 40 to about 90 parts by weight of the copolymers of a vinyl aromatic compound and an α,β-unsaturated cyclic anhydride, from about 95 to about 5, preferably from about 60 to about 10 parts by weight of the impact modifier (b), and preferably from about 1 to about 75 parts by weight of a polyphenylene ether resin.

The compositions of the invention can also include other ingredients, such as flame retardants, extenders, processing aids, pigments, stabilizers and the like, for their conventionally employed purposes. Reinforcing fillers, in amounts sufficient to impart reinforcement, can be used, such as aluminum, iron or nickel, and the like, and non-metals, such as carbon filaments, silicates, such as acicular calcium silicate, and platey magnesium or aluminum silicates, asbestos, titanium dioxide, potassium titanate and titanate whiskers, glass flakes and fibers.

The preferred reinforcing fillers are of glass. In general, best properties will be obtained if glass filaments are employed in amounts of from about 10 to about 40% by weight, based on the combined weight of glass and resin. However, higher amounts can be used.

The compositions of the invention may be prepared by blending the components in a Henschel mixer and compounding the mixture on a twin-screw 28 mm Werner-Pfleiderer extruder. Thereafter, the extrudate is chopped into pellets and molded on a Newbury injection molding machine.

The present invention is further illustrated in the following examples, which are not to be construed as limiting. All parts are by weight.

EXAMPLES 1-4

Blends of styrene-maleic anhydride copolymers, acrylic unit containing impact modifying polymer and poly(2,6-dimethyl-1,4-phenylene)ether resin are prepared by blending the components in a Henschel mixer and thereafter compounding the mixture on a twin-screw 28 mm Werner-Pfleiderer extruder. Thereafter the extrudate is chopped into pellets and molded on a Newbury injection molding machine. The formulations and test results are set forth in Table 1.

TABLE 1

| Compositions Comprising Styrene/Maleic Anhydride Copolymer and Acrylic Graft Copolymer | | | | | | |
|---|---|---|---|---|---|---|
| Example | 1 | 1A* | 2 | 3 | 4 | 4A* |
| Composition (parts by weight) | | | | | | |
| Styrene-Maleic anhydride copolymer[a] | 70 | 100 | 60 | — | — | — |
| Styrene-Maleic anhydride Copolymer (rubber modified)[b] | — | — | — | 80 | 70 | 100 |
| Acrylic ester impact modifier[c] | 30 | — | 30 | 20 | 20 | — |
| poly(2,6-dimethyl-1,4-phenylene ether[d] | — | — | 10 | — | 10 | — |
| Properties | | | | | | |
| Tensile yield, psi | 7500 | 9300 | 7600 | 6700 | 7200 | 7800 |
| Tensile strength, psi | 7500 | 9300 | 7600 | 5000 | 5800 | 6400 |
| Elongation, % | 8 | 9 | 11 | 28 | 50 | 31 |
| Izod impact, ft.-lbs./in. notch | 0.5 | 0.4 | 0.6 | 2.1 | 3.2 | 1.8 |
| Gardner impact, in-lbs. | <10 | <10 | 42 | 20 | 50 | <10 |
| Heat distortion temperature at 266 psi, °F. | 212 | 210 | 224 | 210 | 222 | 212 |

*Control
[a] Dylark 232, Arco Chemicals
[b] Dylark 240, Arco Chemicals
[c] Acryloid KM 323B Rohm & Haas
[d] PPO, General Electric Company Especially noteworthy is the ability of the impact modifier to upgrade the impact properties of the unmodified styrene/maleic anhydride copolymer when used in conjunction with the polyphenylene ether. The impact properties of the rubber modified styrene/maleic anhydride copolymer is efficiently upgraded with the impact modifier in the presence and absence of polyphenylene ether.

EXAMPLES 5-6

The procedure of Examples 1-4 are repeated, substituting a graft copolymer of styrene and polybutadiene rubber. A graft copolymer comprising styrene-methyl methacrylate and polybutadiene rubber is included for comparison purposes. The formulations used and property data obtained are summarized in Table 2.

TABLE 2

Compositions Comprising Styrene/Maleic Anhydride Copolymer and Styrene-Polybutadiene Graft Copolymers

| Example | 5A* | 5 | 6 | 6A* | 6B* |
|---|---|---|---|---|---|
| Composition (parts by weight) | | | | | |
| Styrene-maleic anhydride copolymer[a] | 100 | 70 | 60 | 70 | 60 |
| Styrene-polybutadiene graft polymer[b] | — | 30 | 30 | — | — |
| Styrene-methyl methacrylate polybutadiene graft polymer[c] | — | — | — | 30 | 30 |
| Poly(2,6-dimethyl-1,4-phenylene ether[d] | — | — | 10 | — | 10 |
| Properties | | | | | |
| Tensile yield, psi | 9300 | 5900 | 6300 | 7900 | 7900 |
| Tensile strength, psi | 9300 | 5600 | 5800 | 5600 | 5900 |
| Elongation, % | 9 | 21 | 18 | 20 | 23 |
| Izod impact, ft.-lbs/in. notch | 0.43 | 1.4 | 3.2 | 0.69 | 0.67 |
| Gardner impact, in.-lbs. | <10 | 33 | 32 | <10 | <10 |
| Heat distortion temp. at 266 psi, °F. | 218 | 205 | 219 | 212 | 225 |

*Controls
[a]Dylark 232, Arco Chemicals
[b]Blendex 525, Marbon Chemicals
[c]Acryloid KM-611, Rohm & Haas
[d]PPO, General Electric Company The improvement in toughness of crystal grades of styrene-maleic anhydride is especially marked with the graft copolymer of styrene-polybutadiene.

EXAMPLES 7–8

The general procedure of Examples 1–4 is used to formulate, mold and test compositions which include a normally liquid polybutadiene oligomer as a ductile impact (Gardner) modifier. The formulations and properties are set forth in Table 3.

TABLE 3

Composition Comprising Styrene-Maleic Anhydride Copolymer, Segmented Copolyester or Acrylic-Styrene-Diene Rubber Graft, Polphenylene Ether and Polybutadiene Oligomer

| Example | 7 | 7A* | 8 | 8A* |
|---|---|---|---|---|
| Composition (parts by weight) | | | | |
| Styrene-maleic anhydride copolymer (rubber modified)[a] | 70 | 70 | 70 | 70 |
| Segmented Copolyester of Poly (1,4-butylene-propylene glycol) terephthlate[b] | 20 | 20 | — | — |
| Styrene-methyl methacrylate polybutadiene graft[c] | — | — | 20 | 20 |
| Poly(2,6-dimethyl-1,4-phenylene ether)[d] | 10 | 10 | 10 | 10 |
| Liquid polybutadiene Oligomer[e] | 1 | — | 1 | — |
| Properties | | | | |
| Tensile yield, psi | 7100 | 7500 | 7200 | 7600 |
| Tensile strength, psi | 5800 | 7400 | 5600 | 5900 |
| Elongation, % | 25 | 9 | 39 | 38 |
| Gardner impact, in.-lbs. | 65 | 7 | 135 | 83 |

*Control
[a]Dylark 240, Arco Chemicals
[b]Hytrel 5555, Dupont Co.
[c]Acryloid KM-611, Rohm & Haas
[d]PPO, General Electric Co.
[e]Molecular weight 2000, viscosity at 50° C., 290 poise

EXAMPLES 9–10

The general procedure of Examples 1–4 is used to formulate, mold and test compositions which include a normally liquid polybutadiene oligomer as a ductile impact (Gardner) modifier. The formulations and properties are set forth in Table 4:

TABLE 4

Compositions Comprising Styrene/Maleic Anhydride Copolymer, Rubber Modified Polystyrene or Styrene-Butadiene Graft Copolymer, Polyphenylene Ether and Polybutadiene Oligomer

| Example | 9 | 9A* | 10 | 10A* |
|---|---|---|---|---|
| Composition (parts by weight) | | | | |
| Styrene-maleic anhydride copolymer (rubber modified)[a] | 60 | 60 | 70 | 70 |
| Rubber modified Polystyrene[b] | 30 | 30 | — | — |
| Styrene-polybutadiene graft copolymer[c] | — | — | 20 | 20 |
| Poly(2,6-dimethyl-1,4-phenylene ether resin[d] | 10 | 10 | 10 | 10 |
| Liquid polybutadiene Oligomer[e] | 1 | — | 1 | — |
| Properties | | | | |
| Tensile yield, psi | 5900 | 5800 | 6500 | 6700 |
| Tensile strength, psi | 5300 | 5300 | 5600 | 5800 |
| Elongation, % | 50 | 48 | 36 | 39 |
| Gardner impact, in.-lbs. | 49 | 19 | 85 | 20 |

*Control
[a]Dylark 240, Arco Chemicals
[b]TGD-2500 25% rubber, Union Carbide
[c]Blendex 525, Marbon Chemicals
[d]PPO, General Electric Co.
[e]Molecular weight 2000, viscosity at 50° C., 290 poise.

In Examples 7–10, the addition of only 1% of liquid polybutadiene oligomer improves the Gardner impact strength at least one and one-half times.

EXAMPLE 11

A styrene-maleic anhydride copolymer containing 15 mole % of maleic anhydride is blended 50:50 with poly(2,6-dimethyl-1,4-phenylene ether). After molding and testing it is found that the heat distortion temperature is 40° F. higher than that of a corresponding composition comprising 50:50 of polystyrene and poly(2,6-dimethyl-1,4-phenylene ether. A similar composition in which the anhydride function has been pre-reacted with aniline has only a slightly lower heat distortion temperature, but higher than the polystyrene comparison composition.

Obviously, many variations will suggest themselves to those skilled in the art, in view of the above detailed disclosure. All such variations are within the full intended scope of the appended claims.

We claim:

1. A thermoplastic molding composition which comprises an intimate admixture of:
   (a) a rubber-modified copolymer of a vinyl aromatic compound and an alpha, beta-unsaturated cyclic anhydride, and
   (b) an impact modifier consisting essentially of a rubber modified alkenyl aromatic compound consisting essentially of styrene-polybutadiene graft copolymer;
   (c) a polyphenylene ether resin; and
   (d) an effective ductile impact strength improving amount of a low molecular weight normally liquid polybutadiene oligomer.

2. A composition as defined in claim 1 wherein said vinyl aromatic compound of component (a) is selected from the formula:

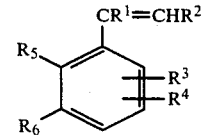

wherein $R^1$ and $R^2$ are lower alkyl or alkenyl groups of from 1 to 6 carbon atoms or hydrogen; $R^3$ and $R^4$ are chlorl, bromo, hydrogen or lower alkyl of from 1 to about 6 carbon atoms; $R^5$ and $R^6$ are hydrogen, or lower alkyl or alkenyl groups of from 1 to 6 carbon atoms or $R^5$ and $R^6$ may be concatenated together with hydrocarbyl groups to form a naphthyl group, said compounds being free of any substituent that has a tertiary carbon atom; and wherein said $\alpha,\beta$-unsaturated cyclic anhydride of component (a) is represented by the formula:

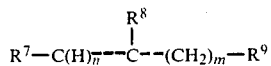

wherein the dotted lines represent a single or a double carbon to carbon bond, $R^7$ and $R^8$ taken together represents a

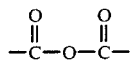

linkage, $R^9$ is hydrogen, vinyl, alkyl, alkenyl, alkylcarboxylic or alkenylcarboxylic of from 1 to 12 carbon atoms, n is 1 or 2, depending on the position of the carbon-carbon double bond, and m is 0 or an integer of from 1 to about 10.

3. A composition as defined in claim 1 wherein said thermoplastic composition includes from about 5 to about 95% by weight of said copolymer (a) and from 95 to 5 parts by weight of said impact modifier (b).

4. A composition as defined in claim 3 wherein said thermoplastic composition includes from about 40 to about 90 parts by weight of said copolymer (a) and from about 60 to about 10 parts by weight of said impact modifier (b).

5. A composition as defined in claim 1 wherein component (a) comprises from 40 to 1 parts by weight of an $\alpha,\beta$-unsaturated cyclic anhydride and from 60 to 99 parts by weight of a vinyl compound, and from 25 parts or less by weight of rubber.

6. A composition as defined in claim 1 wherein said impact modifier (b) consisting essentially of from 1 to 50 parts by weight of the styrene and from 99 to 50 parts by weight of the polybutadiene.

7. A composition as defined in claim 1 wherein said polyphenylene ether resin is of the formula:

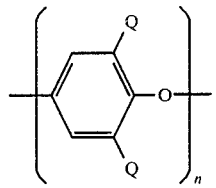

wherein the oxygen ether atom of one unit is connected to the benzene nucleus of the next adjoining unit, n is a positive integer and is at least 50, and each Q is a monovalent substituent selected from the group consisting of hydrogen halogen, hydrocarbon radicals free of a tertiary alpha-carbon atom, halo hydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

8. A composition as defined in claim 1 wherein said polyphenylene ether resin is present in an amount of from about 1 to about 75 parts of weight.

9. A composition as defined in claim 1 wherein said butadiene oligomer (d) comprises from about 0.5 to about 5% by weight based on the total weight of (a), (b), (c) and (d).

10. A composition as defined in claim 1 wherein said rubber-modified copolymer (a) is a diene rubber-modified copolymer of styrene and maleic anhydride.

* * * * *